(12) United States Patent
Schneider et al.

(10) Patent No.: US 8,408,768 B2
(45) Date of Patent: Apr. 2, 2013

(54) LIGHTING DEVICE FOR A VEHICLE

(75) Inventors: Ingolf Schneider, Rüsselsheim (DE); Heiko Eckert, Rüsselsheim (DE); Ralph Schneider, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 13/021,258

(22) Filed: Feb. 4, 2011

(65) Prior Publication Data
US 2011/0194301 A1    Aug. 11, 2011

(30) Foreign Application Priority Data
Feb. 5, 2010   (DE) .................. 10 2010 006 974

(51) Int. Cl.
*F21V 9/00*   (2006.01)
*B60Q 3/04*   (2006.01)
*F21S 8/10*   (2006.01)
(52) U.S. Cl. ................. 362/511; 362/543; 362/544
(58) Field of Classification Search .................. 362/511, 362/543–545
See application file for complete search history.

(56) References Cited

U.S. PATENT DOCUMENTS

| | | | | |
|---|---|---|---|---|
| 5,984,497 | A * | 11/1999 | Foerstner et al. | 362/511 |
| 6,652,129 | B2 * | 11/2003 | Aoki | 362/600 |
| 6,951,414 | B2 * | 10/2005 | Amano | 362/511 |
| 6,955,459 | B2 * | 10/2005 | Mochizuki et al. | 362/602 |
| 7,278,768 | B2 * | 10/2007 | Gasquet | 362/539 |
| 7,484,869 | B2 * | 2/2009 | Kogo et al. | 362/538 |
| 7,775,697 | B2 * | 8/2010 | Hirano et al. | 362/511 |
| 7,806,573 | B2 * | 10/2010 | Terada et al. | 362/539 |
| 8,007,149 | B2 * | 8/2011 | Nagasawa et al. | 362/511 |
| 8,057,081 | B2 * | 11/2011 | Schwab | 362/511 |
| 2009/0154186 | A1 * | 6/2009 | Natsume et al. | 362/516 |
| 2010/0290243 | A1 | 11/2010 | Janssen | |
| 2011/0019431 | A1 | 1/2011 | Wegner et al. | |

FOREIGN PATENT DOCUMENTS

| | | |
|---|---|---|
| DE | 10065020 A1 | 3/2002 |
| DE | 10109357 A1 | 9/2002 |
| DE | 10328214 A1 | 2/2005 |
| DE | 102004051178 A1 | 5/2006 |
| DE | 102005008634 A1 | 8/2006 |
| DE | 102005023817 A1 | 11/2006 |
| DE | 102008044357 A1 | 6/2009 |
| EP | 1987284 A1 | 11/2008 |
| WO | 2007096559 A1 | 8/2007 |
| WO | 2009010465 A1 | 1/2009 |

OTHER PUBLICATIONS

British Patent Office, British Search Report for Application No. 1101352.1, dated May 3, 2011.
German Search Report dated Jun. 24, 2010, issued in Application No. 10 2010 006 974.4.

* cited by examiner

*Primary Examiner* — David J Makiya
(74) *Attorney, Agent, or Firm* — Ingrassia Fisher & Lorenz, P.C.

(57) ABSTRACT

With a lighting device for a vehicle with at least one signal lamp as well as an additional lamp a first covering, through which a part of the light generated by the signal lamp is radiated, is arranged. A part of the light generated by the signal lamp is directed via a light guide into the region of the additional lamp and radiated in the region of the additional lamp.

8 Claims, 2 Drawing Sheets

LIGHTING DEVICE FOR A VEHICLE

CROSS-REFERENCE TO RELATED APPLICATION

This application claims priority to German Patent Application No. DE 102010006974.4, filed Feb. 5, 2010, which is hereby incorporated by reference in its entirety.

TECHNICAL FIELD

The technical field relates to a lighting device for a vehicle, particularly a front headlamp.

BACKGROUND

From DE 103 28 214 A1 a lighting device with a daylight headlamp and with a low-beam light and/or high-beam light headlamp is known, wherein under the covering disc of the lighting device a driving direction indicator is additionally arranged. Various demands are made on such lighting devices. On the one hand, they have to satisfy the legal regulations, which particularly regulate the total intensity and the radiation characteristic of the radiated light. On the other hand, lighting devices substantially co-determine the aesthetic impression of a vehicle and offer numerous possibilities of creating an unmistakable impression through their design.

Therefore, at least one object is to state a lighting device for a vehicle with which both relevant legal regulations can be observed as well as unusual designs realized. In addition, other objects, desirable features and characteristics will become apparent from the subsequent summary and detailed description, and the appended claims, taken in conjunction with the accompanying drawings and this background.

SUMMARY

According to an embodiment, a lighting device is provided for a vehicle that comprises at least one signal lamp as well as one additional lamp. In front of the signal lamp a first covering is arranged through which a part of the light generated by the signal lamp is radiated. Here, and in the following, an arrangement of the covering "in front" of a lamp shall mean an arrangement of the covering in the optical path between lamp and beholder, so that at least a part of the light generated by the lamp in operation passes regions of the covering.

A part of the light generated by the signal lamp is directed into the region of the additional lamp via a light guide and radiated in the region of the additional lamp. A region of a lamp here and in the following shall mean a region in the immediate vicinity of said lamp, particularly a region that is or can be illuminated by the light generated by said lamp. Accordingly, a part of the light generated by the signal lamp is not radiated in the region of the signal lamp but in the region of an additional lamp. Thus the radiation characteristic of the signal lamp, i.e. the angle distribution of the light made available by said signal lamp, changes without the signal lamp itself or its spatial arrangement having to be modified. This has the advantage that the light generated by the signal lamp can be distributed in accordance with the legal guidelines, wherein at the same time an attractive design of the lighting device can be realised. In particular, the spatial arrangement of the signal lamp is thus no longer directly dependent on the legal requirements for the radiation characteristic, so that a substantially greater design freedom materializes.

According to an embodiment, an additional covering is arranged in front of the additional lamp and the light directed via the light guide into the region of the additional lamp is radiated via the additional covering. Accordingly, a path of a part of the light radiated by the signal lamp through the light guide and the additional covering is obtained.

In an embodiment, the additional lamp is arranged more closely to a centre longitudinal axis of the vehicle than the signal lamp. Thus, a part of the light generated by the signal lamp is radiated further inside than it is generated. The signal lamp can be particularly designed as daylight driving lamp. The additional lamp can be particularly designed as driving direction indicator.

In the light guide, the light guidance for example takes place by means of total reflection. To this end, particularly light guides of a core and a jacket are used, wherein the core has a high relative refractive index which in the jacket decreases suddenly or gradually. However, a light guide also means other bodies which based on their characteristics, for example also by means of reflecting/mirrored surfaces, transport at least a large part of the coupled-in light as far as to a decoupling point.

Advantageously, components which are present anyhow can be utilized as light guides, for example facings or design elements. If this is possible through a suitable material choice and if applicable minor modifications of the components for example in the region of the coupling-in and the decoupling point and in the region of sharp bends, where light could be unintentionally decoupled, the advantage that additional components can be omitted is obtained. Alternatively or additionally however optical fibres or other light guides can also be provided for this purpose. This has the advantage that the light guide or light guides alone can be optimised towards this objective.

In an embodiment, the first covering is at least partially designed as diffusing lens. A diffusing lens here and in the following shall mean a component which, arranged in the optical path, diffuses light radiated from the lamps and/or light striking the diffusing lens from the outside. The additional covering, too, can at least partially be designed as diffusing lens.

In an embodiment, the first covering is arranged in the optical path between signal lamp and light guide. With this embodiment, the light guide is thus arranged before or outside on the covering. In an embodiment, the first covering and the additional covering are enclosed by a covering of the lighting device and the light guide is integrated in a design element, which is partially fitted on to the covering of the lighting device on the outside or is arranged adjoining the latter.

The lighting device can furthermore comprise a low-beam and/or high-beam headlamp, if this is not already utilized as additional lamp for the radiation of a part of the light of the signal lamp.

The described lighting device is particularly suitable for motor vehicles, for example as front lighting.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
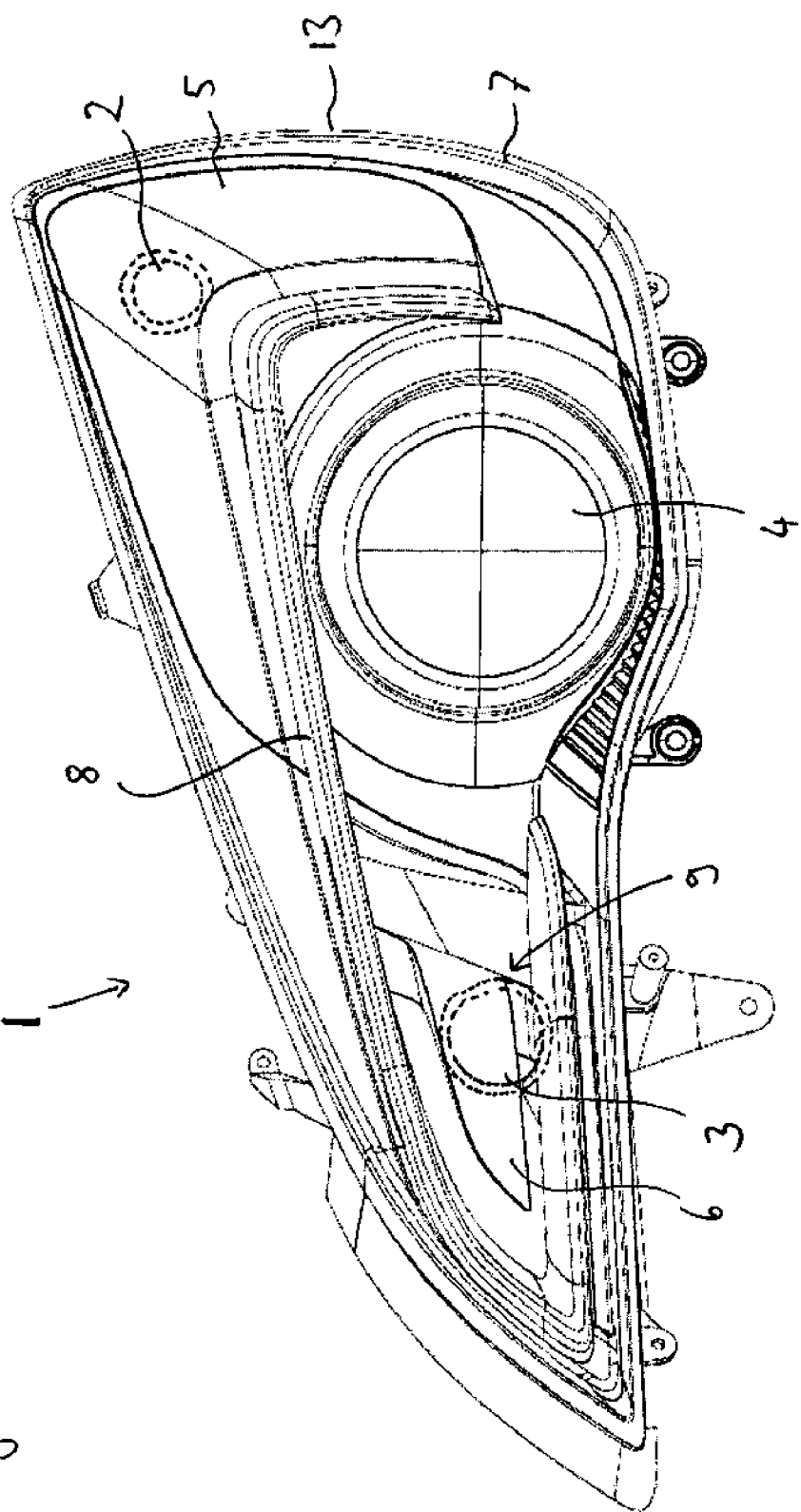
FIG. 1 schematically shows a lighting device according to an embodiment.

FIG. 1 schematically shows a lighting device 1 for a motor vehicle which in a common housing 7 comprises a low-beam and high-beam headlamp 4, a signal lamp designed as daylight driving lamp 2 and a driving direction indicator 3. The daylight driving lamp 2 comprises a first covering 5 which is designed as diffusing links, occasionally also termed reflector. The daylight driving lamp 2 is therefore only shown in broken line in FIG. 1. The driving direction indicator 3 comprises an additional covering 6 which is likewise designed as diffusing lens. The driving direction indicator 3 is thus likewise only represented as a broken line. The first covering 5 and the additional covering 6 can be integrated in a covering, covering the entire lighting device 1. Such a covering however is not shown in the Figures for the sake of clarity.

The lighting device 1 additionally comprises a design element 8 for example designed as facing, which through its configuration contributes to the unmistakeable character of the lighting device and which adjoins both the first covering 5 as well as the additional covering 6.

With the embodiment shown in FIG. 1 the daylight driving lamp 2 is located further removed from a central longitudinal axis of the vehicle than the driving direction indicator 3. The daylight driving lamp 2 is even located far on the outer edge 13 of the lighting device 1 and of the vehicle. According to the legal regulations the daylight driving lamp 2 must be adequately visible from various angles. It must therefore have a radiation characteristic according to which a sufficient amount of light is radiated to the front or in the direction of the vehicle centre. So as not to interfere with and not having to substantially change the arrangement of the low-beam or high-beam headlamp 4, of the daylight driving lamp 2, of the driving direction indicator 3 and the design element 8 relative to one another and the entire appearance of the lighting device 1, the design element 8 is utilized as light guide in order to radiate a part of the light generated by the daylight driving lamp 2 in the region 9 of the driving direction indicator. Despite the arrangement of the daylight driving lamp 2 in the vicinity of the outer edge 13 is it possible in this manner to comply with the legal regulations.

Figure 2:
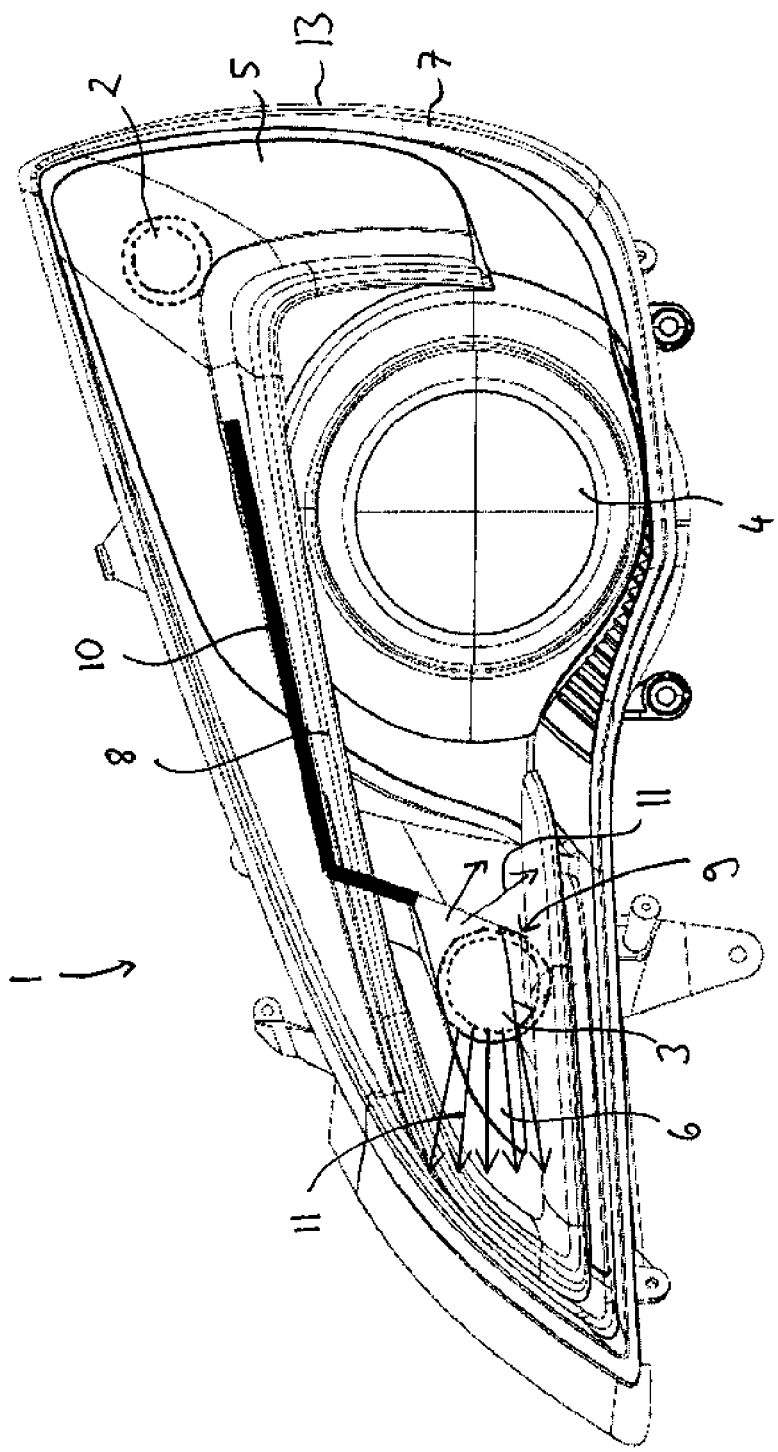
FIG. 2 schematically shows the optical path in the lighting device according to FIG. 1.

FIG. 2 schematically shows the optical path in the lighting device 1 according to FIG. 1. Light generated by the daylight driving lamp 2 is diffused by the first covering 5 designed as diffusing lens and leaves the lighting device 1 in driving direction. A part of the diffused light however is coupled into regions of the adjoining design element 8 immediately following the exiting of the first covering 5 and in said design element is directed into the region 9 of the driving direction indicator 3 along the thick black line 10. There it is decoupled and enters the additional covering 6 likewise adjoining the design element 8 and designed as diffusing lens and leaves the lighting device 1 in driving direction as is indicated by the arrows 11.

Thus, a part of the light made available by the daylight driving lamp 2 leaves the lighting device 1 in the region of the driving direction indicator 3 and thus further in the direction of the vehicle centre. The visibility of the vehicle has thus been improved through this modification of the radiation characteristic. Thus it was utilized in the shown embodiment that the first covering 5 and the additional covering 6 adjoin the design element 8 anyhow, so that through suitable selection of the material of the design element 8 the latter can be utilized as light guide.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A lighting device for a vehicle comprising:
   a housing;
   a daylight driving lamp in the vicinity of an outer edge of the housing;
   a headlamp in the housing
   a driving direction indicator lamp in the housing;
   a transparent light guide;
   a first covering in front of the daylight driving lamp through which a first part of light generated by the daylight driving lamp is configured to radiate, where the first part of light does not pass through the light guide; and
   the light guide configured to direct a second part of light generated by the daylight driving lamp into a region of the driving direction indicator lamp and radiate from the region of the driving direction indicator lamp, wherein the light guide directs the second part of light generated by the daylight driving lamp from the vicinity of the outer edge of the housing, past the headlamp, and into the region of the driving direction indicator such that light generated by the daylight driving lamp is radiated from both the vicinity of the outer edge of the housing and the region of the driving direction indicator lamp to be visible from various angles.

2. The lighting device according to claim 1, further comprising an additional covering arranged in front of the driving direction indicator lamp, wherein light directed via the light guide into the region of the driving direction indicator lamp is radiated via the additional covering.

3. The lighting device according to claim 1, wherein the driving direction indicator lamp is arranged at a first distance to a centre longitudinal axis of the vehicle and the daylight driving lamp is arranged at a second distance that is greater than the first distance.

4. The lighting device according to claim 1, wherein a light conductance takes place by reflection in the light guide.

5. The lighting device according to claim 1, wherein the first covering comprises a diffusing lens.

6. The lighting device according to claim 2, wherein the additional covering comprises a diffusing lens.

7. The lighting device according to claim 1, the headlamp comprising a low-beam headlamp.

8. The lighting device according to claim 1, the headlamp comprising a high-beam headlamp.

* * * * *